Patented Feb. 8, 1949

2,461,495

UNITED STATES PATENT OFFICE 2,461,495

POLYAMIDES

Don E. Floyd, Minneapolis, Minn., assignor to General Mills, Inc., a corporation of Delaware No Drawing. Application September 8, 1945, Serial No. 615,245

11 Claims. (Cl. 260—78)

The present invention relates to the preparation of novel polyamides which are prepared from malonates containing an aliphatic hydrocarbon substituent and polyamines.

A wide variety of polyamides have been described in prior patents. The properties of these polyamides have varied widely from soft, tacky materials to hard, high-melting products, some of which can be drawn into fibers suitable for textiles.

It has now been discovered that polyamides having novel properties may be prepared from malonates containing an aliphatic hydrocarbon substituent in which the aliphatic hydrocarbon substituent may contain from 6 to 16 or more carbon atoms. The properties of the polyamides may be varied by varying the aliphatic hydrocarbon group both in chain length and in degree of unsaturation. Such products have been found useful as waxes, coating materials, resins, and plastics, heat sealing agents, bonding agents, plasticizers for cellulose derivatives, polyvinyl derivatives, rubber, and other resins, plastics, and coatings. Variations in the chain length of the aliphatic hydrocarbon substituent on the malonate and the degree of unsaturation of the substituent alter considerably the characteristics and physical properties of the polyamide products. The properties which can be altered or formulated at will include solubility, compatibility, viscosity, hardness, toughness, adhesion to surfaces, elasticity, melting point, solubility, and other properties.

It is, therefore, an object of the present invention to provide novel polyamide products derived from malonates having a long aliphatic hydrocarbon substituent. It is another object of the present invention to provide a process of preparing such polyamides.

The inventor has found that the size of the lateral hydrocarbon substituent and the degree of unsaturation in malonic esters containing an aliphatic hydrocarbon substituent make a marked and noticeable difference in the properties of the resulting polyamides. The lateral hydrocarbon substituents in the range of $C_6$ to $C_{16}$, both saturated and unsaturated have been found to be most valuable. Numerous advantages result from the use of these malonates as compared to the use of un-substituted malonic acids and other dibasic acids and their low aliphatic substitution products in polyamides. These novel properties are due primarily to the effect of the long chain aliphatic hydrocarbon substituent on the malonate.

Some of these advantages can be briefly summarized here. The polyamides disclosed herein are more soluble in hydrocarbon solvents than unsubstituted or low aliphatic substituted polyamides from corresponding materials. This is an advantage in the preparation of solutions of coating materials where hydrocarbon solvents are generally used. The softening points are in a range of greater utility, whereas lack of substitution or low aliphatic substitution often leads to products whose high softening points or near infusibility makes them nearly useless. Those polyamides with substituents containing a high degree of unsaturation can be converted by heat into thermosetting resins. This is an advantage in the preparation of baked coatings and molded products where an article that will not soften with heat is desired. They are more resistant to the action of lower alcohols probably because the lateral substituent decreases the solubility in such solvents as it becomes more hydrocarbonlike in character. A further advantage is in the ease of manipulation of the substituted malonic esters during polyamide formation. Since they are relatively high-boiling liquids compared to the unsubstituted or low-aliphatic substituted malonic esters, there is less likelihood of loss of ester through volatilization during the reaction at the high temperature required, particularly while the by-product alcohol is evolved. This becomes increasingly important when it is known that an excess of either reagent leads to smaller molecules which are usually of much less value. A further advantage ensues from the increased molecular weight of the malonate containing a higher aliphatic hydrocarbon substituent. This means that on a weight basis much less of the expensive amino compound is required for reaction than with unsubstituted or low aliphatic substituted malonic esters and with many other dibasic acids or their esters. This is advantageous from a commercial standpoint.

In the prior polyamide patents it is frequently stated that the polyamides should not have a unit length of the recurring group of the polyamide of less than 9. Where unit lengths of 5, 6, 7, or sometimes even 8, are found, cyclization is likely to occur. Such cyclic products are usually high melting or infusible solids and are usually useless for coatings, sealing agents, fibers, waxes, and other uses to which polyamides are put. The present inventor has found that many useful polyamide products can be prepared where the dibasic acid is a malonate having a long aliphatic hydrocarbon chain substituent, even where the unit length is reduced to 8. It is to be understood of course, that polyamides of greater unit length than 8 can also be prepared from these alkyl substituted malonates.

The malonic esters containing aliphatic hydrocarbon substituents employed in the present invention may be prepared in accordance with any known method. It is preferred, however, to prepare these substituted malonates by the action of oxalate esters on various fatty acid esters as disclosed in my copending application, Serial No. 596,811, filed May 30, 1945, in which event the malonic ester will have an aliphatic hydrocarbon substituent corresponding to the entire aliphatic group of the fatty acid beyond the alpha carbon atom of the fatty acid. The general reaction for the formation of polyamides may be represented as follows:

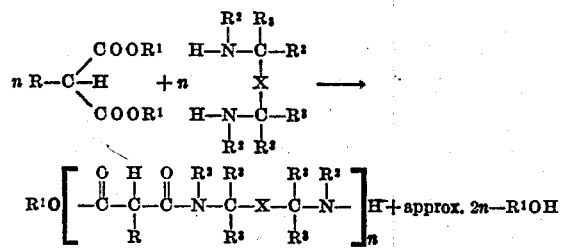

R represents an aliphatic residue or mixtures thereof containing from 6 to 16 carbon atoms and may be saturated or unsaturated. $R^1$ represents a low aliphatic group such as methyl, ethyl, propyl, butyl and the like. The two $R^1$ groups may be alike or different. $R^2$ may be hydrogen or alkyl. Here also the two $R^2$ groups may be alike or different. The $R^3$ groups also may be hydrogen or alkyl and may be alike or different. X may be methylene, ethylene, trimethylene, decamethylene or any other methylene chain or may include carbon or carbon chains connected by single or multiple bonds to which other groups may be attached, said groups including hydroxyl, alkyl, amino and other groups or combinations thereof. X may also represent nitrogen to which various groups may be attached such as hydrogen, alkyl, alkanol, and the like; it may represent sulfur or it may represent cyclic groups such as those derived from benzene, furane, cyclohexane, and the like.

These include such amino compounds as ethylene diamine, trimethylene diamine, hexamethylene diamine, diethylene triamine, polyethylene polyamines, propylene diamine, and polypropylene polyamines, 1,3-diaminopropanol, and many other diamines and polyamines. The presence of other groupings not mentioned and not taking part in the reaction is by no means harmful and can be useful in developing special properties. It is also possible to use amino compounds not exemplified by the formula in the above reaction, such as cyclic compounds containing two or more amino groups. This would include such materials as phenylene diamines, tolylene diamines, diaminodiphenylmethanes, diaminodiphenyloxides, diaminocyclohexane and many similar compounds. Since many variations in the kinds of amino compounds not specifically mentioned here can be made without departing from the scope of the invention, it is to be understood that the invention is not limited to the substances specifically described in this application.

"$n$" stands for a numerical figure representing the average number of monomeric units in the polyamide. In cases where amino groups or hydroxyl groups in addition to those illustrated in the equation above are present, more complex products containing cross-linkages may result and the amount of alcohol ($R^1OH$) produced may differ from approximately 2.

The presence of a catalyst is usually not necessary for reaction between the ester and amino groupings. In cases where hydroxyl groups are also present, the use of catalysts normally employed in alcoholysis or ester interchange will promote reaction between the ester and hydroxyl groups if so desired. A wide variety of catalysts consisting of metals, metal oxides, and metal salts well known to those skilled in the art have been found useful.

Reaction between the aliphatic hydrocarbon substituted malonate and the amino compound is usually carried out by stirring vigorously and heating at temperatures in the range of 150° to 300° C., while the alcohol produced as a reaction by-product is distilled and collected. In cases where the reactants are subject to oxidation it is of value to conduct such reactions in the presence of an inert gas such as carbon dioxide or nitrogen. It is possible to judge the extent of reaction by measuring or weighing the alcohol produced as by-product. Thus the reaction may be controlled to give relatively small molecules by stopping far short of complete reaction or to give larger molecules by allowing the reaction to proceed further. In many cases it is of value to apply a vacuum to the reacting materials. This excludes air and also tends to remove the by-product alcohol, thus promoting formation of large molecules. While it is known that such reactions never proceed to 100% completion, use of a molecular still will cause reactions to approach very nearly to completion, producing very large molecules as a result.

At temperatures below 150° C. reaction is very slow and sometimes will not take place at all, whereas at 275–300° C. the malonic esters begin to decompose, and the use of a vacuum at these temperatures tends to hasten the decomposition.

The ratios of reactants may be varied considerably in order to affect the properties of the final product. If either reactant is allowed to remain in excess during reaction, there is a tendency towards relatively smaller molecules.

The following general procedure was followed in all the examples given below. Any variation from the general procedure will be described with each specific example.

Equivalent molal quantities of the substituted malonate and the amino compound were weighed out into a suitable flask fitted with an efficient stirrer and a Claisen type still-head which was connected to a condensing device and receiving vessel. An outlet for attachment to a source of vacuum (usually by water pump) or inert gas was connected to the receiving vessel. The reactants were heated by a suitable oil or air bath in the range of 150°–300° C. while being stirred and the by-product alcohol was distilled off. In many cases reaction was conducted in an atmosphere of nitrogen. When the distillation of alcohol had nearly ceased, vacuum was applied and heating and stirring was continued. The by-product alcohol produced was collected in a dry ice trap. The amount of by-product alcohol obtained always approximately 95% of the theoretical amount. The final product was allowed to cool to room temperature, often in an atmosphere of nitrogen or carbon dioxide.

Example 1

The reactants were 30 g. (0.1 mole) of diethyl decylmalonate and 7.5 g. (0.1 mole) of 1,3-diaminopropane. After heating at 190–200° C. for three hours, vacuum (14 mm.) was applied and heating continued for two more hours. The resin produced was pale amber in color and was quite hard, but somewhat brittle. It formed filaments readily while in the molten state. The amount of by-product alcohol obtained was 8.8 grams, indicating 95.5% complete reaction.

Example 2

The reactants were 27.2 g. (0.1 mole) of diethyl octylmalonate and 8.8 g. (0.1 mole) of 1,3-diaminobutane. They were heated at atmospheric pressure for three hours at 190–200° C. and under vacuum for two more hours at the same temperature. The final product was less brittle than the preceding resin. It was amber in color and could be drawn into filaments while molten. It appeared to have value as a coating material. The amount of by-product alcohol obtained was 8.7 grams indicating 94.5% complete reaction.

Example 3

Fifty grams (⅛ mole) of diethyl decylmalonate and 19.4 g. (⅛ mole) of hexamethylene diamine were allowed to react near 200° C. first at atmospheric pressure, then under vacuum as described above. When cooled a hard, glassy polyamide was produced. It possessed a hard surface and considerable toughness. It was thermoplastic as were the products of previous examples and could be drawn into threads or filaments while molten. This resin has valuable heat-sealing properties.

Example 4

40.7 g. (⅛ mole) of diethyl hexylmalonate and 17.2 g. (⅛ mole) of diethylene triamine were allowed to react for three hours at atmospheric pressure at about 200° C. and then two more hours in vacuum at the same temperature. The polyamide product was a soft, sticky resin, pale amber in color. It was slightly soluble in water. The amount of by-product alcohol was 14.5 grams indicating 96% complete reaction.

When this resin was heated at 80–100° C. with 5% of its weight of paraformaldehyde for one hour, it became hard and tough and was no longer soluble in water.

The resin was compatible to a high degree with cellulose acetate, both before and after treatment with paraformaldehyde, improving the adhesion and flexibility of the cellulose acetate. Other similar resins, but in which the alkyl substituent contains 7 or 8 carbon atoms, may be used as resin plasticizers for cellulose acetate.

Example 5

The reactants were 38.5 g. (0.1 mole) of the malonic ester prepared from the methyl ester of soybean fatty acids (prepared as described in the above-mentioned co-pending application) and 7.5 g. (0.1 mole) of 1,3-diaminopropane. Reaction was conducted in an atmosphere of nitrogen for three and one-half hours and under vacuum (about 14 mm.) for two more hours at 190–200° C. The resin produced was a fairly soft but not sticky material. It was tough and pliable and appeared to be quite valuable for use in surface coatings and as a sealing agent. When heated at about 200° C. in the open air it was slowly converted into an infusible resin. The amount of by-product alcohol obtained was 8.7 grams, indicating 94.5% complete reaction.

Example 6

The reactants in this case were 38.5 g. (0.1 mole) of diethyl cetylmalonate and 7.5 g. (0.1 mole) of 1,3-diaminopropane. The reaction was conducted as in the preceding example. The final product when cooled to room temperature was a very hard wax. It started to soften at about 70° C. and when molten could be drawn into filaments. It appears to be an excellent wax, very hard, although somewhat brittle. It is not heat or oxygen convertible. It finds utility for compounding of wax and finish preparations. 8.6 grams of by-product alcohol were obtained indicating 93.4% complete reaction.

Example 7

A polyamide was prepared from 24.4 g. (0.1 mole) of diethyl hexylmalonate and 9 g. (0.1 mole) of 1,3-diaminopropanol-2 by heating at 170–200° C. in an atmosphere of nitrogen for two and one-half hours. Reaction was quite rapid and no heating in vacuum was required. The resin produced was very hard and somewhat brittle when cool. While molten it could be drawn into long filaments. 9.1 grams of by-product alcohol were obtained, indicating 98.8% complete reaction.

Example 8

This polyamide was prepared from the reaction between 38 g. (0.1 mole) of the malonic ester prepared from the ethyl esters of linseed fatty acids and 11.6 g. (0.1 mole) of hexamethylene diamine. The reactants were heated at 180° C. under nitrogen for four hours and then in vacuum four hours more. The reaction product was quite similar to that obtained in Example 5. When heated at about 200° C. in the open air it was converted more rapidly to an infusible resin. It is adapted to similar uses as the product in Example 5. By-product alcohol in the amount of 8.5 grams was obtained indicating 92% complete reaction.

Example 9

24.4 g. (0.1 mole) of diethyl hexylmalonate and 10.8 g. of m-phenylene diamine were allowed to react for four hours at about 200° C. under nitrogen and then for two more hours in vacuum at 200° C. The reaction proceeded more slowly than in most of the other examples. The polyamide produced was very hard and somewhat brittle and could be drawn into filaments when molten. It is useful for the preparation of coatings where a hard surface is desired. 8.8 grams of by-product alcohol were obtained, indicating 95.5% complete reaction.

Example 10

24.4 g. of the diethyl hexylmalonate and 12.5 g. of 2,4-diaminotoluene were reacted as in the previous case. The polyamide product was very similar to that obtained in Example 9. Unless the reactions are carried out in the absence of oxygen, discoloration results giving dark resins. 8.7 grams of by-product alcohol were obtained indicating 94.5% complete reaction.

The reaction and the reactants are subject to considerable variation. Thus the temperature, while it may be anywhere within the range 150–300° C., is generally held within the preferred range of 180–210° C. The pressure within the reaction vessel may be atmospheric, or higher or lower than atmospheric. As was pointed out previously the use of vacuum generally increases the viscosity by removal of volatile reaction products. Likewise, depending upon the circumstances, the reaction may be conducted in the presence or absence of air or inert gas. When substances are used which are susceptible to oxidation or discoloration by air, it is preferred to perform the reaction in the absence of air by the use of an inert gas or vacuum, or both. A reaction catalyst is usually not necessary. In cases where reaction is slow, the velocity may be increased by using various known catalysts, such as metals, metallic salts of organic acids, or other metallo-organic derivatives.

It is possible to use a single dibasic acid ester or a mixture containing two or more of such esters. Similarly a single amino compound or mixture of amino compounds can be used. The properties of the resulting products will depend to a large extent on the composition of the dibasic acid ester(s) and the amino compound(s).

Equivalent molal ratios of esters and amino compounds can be used or a slight excess of either reactant can be employed. When an excess of either reagent issued, there is a tendency to form relatively smaller molecules. In many cases it is advantageous to start the reaction with an excess of the amino compound and remove this excess during the latter stages of the reaction by vacuum distillation or sublimation. This insures against a deficiency of amino compound due to loss by volatilization or other causes during the reaction.

Allowing the reaction to proceed nearly to completion produces relatively large polymeric molecules. Smaller molecules can be produced by stopping the reaction at an earlier stage.

During the preparation of the polyamides, fatty acids or their amide forming derivatives may be added as modifying and softening agents. The polyamides may also be modified by treatment with formaldehyde, or other aldehydes or ketones.

A solvent may or may not be employed as reacting medium in polyamide formation. The use of a solvent is dictated partly by convenience and partly by the use for which the polyamide is intended.

While various modifications of the present invention have been described, it is to be understood that the same is not limited thereto but may be varied within the scope of the appended claims.

I claim as my invention:

1. A resinous polyamide having a unit length of at least 8, in which the polyfunctional acyl group has the formula

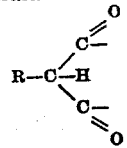

in which R is an aliphatic hydrocarbon substituent containing from 6 to 16 carbon atoms, and in which the polyfunctional amino group has the formula $$HN-X-NH$$

in which X is a divalent organic radical which separates the amino groups by a chain at least 3 atoms in length, said chain being selected from the group consisting of carbon chains and carbon chains interrupted solely by nitrogen, the free valences on the carbonyls of the acyl group being attached to free valences of the nitrogens of the polyamines.

2. A resinous polyamide as in claim 1 in which R is saturated.

3. A resinous polyamide as in claim 1 in which R is unsaturated.

4. A resinous polyamide as in claim 1 in which R is $C_{16}H_{33}$.

5. A resinous polyamide according to claim 1 in which R is a mixture of the aliphatic groups represented by the entire radicals beyond the alpha-carbon atom of the fatty acids of a fat.

6. A resinous polyamide according to claim 1 in which R is a mixture of the aliphatic groups represented by the entire radicals beyond the alpha-carbon atom of the fatty acids of a non-drying fat.

7. A resinous polyamide according to claim 1 in which R is a mixture of the aliphatic groups represented by the entire radicals beyond the alpha-carbon atom of the fatty acids of an unsaturated fat.

8. A resinous polyamide according to claim 1 in which R is an aliphatic hydrocarbon substituent containing 6 to 8 carbon atoms and in which the diamino group is

9. A resinous polyamide according to claim 1 in which X is a hydrocarbon radical which separates the amino groups by at least 3 carbon atoms.

10. A resinous polyamide according to claim 1 in which X is hexamethylene.

11. A resinous polyamide according to calim 1 in which R is $C_{16}H_{33}$ and in which the diamino group is

DON E. FLOYD.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,182,178 | Pikernelle | Dec. 5, 1939 |